US010828954B2

(12) United States Patent
Mohamed et al.

(10) Patent No.: US 10,828,954 B2
(45) Date of Patent: Nov. 10, 2020

(54) RIDE PERFORMANCE OPTIMIZATION SYSTEMS AND DEVICES, AND RELATED METHODS (71) Applicant: FORD GLOBAL TECHNOLOGIES, LLC, Dearborn, MI (US)

(72) Inventors: Ahmed Mohamed, Dearborn, MI (US); Russ Lee Norton, Brownstown Township, MI (US); Phil Lenius, Commerce Township, MI (US); Benjamin Bulat, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/209,068

(22) Filed: Jul. 13, 2016

(65) Prior Publication Data
US 2018/0015801 A1    Jan. 18, 2018

(51) Int. Cl.
*B60G 17/0165*   (2006.01)
*H04W 4/40*   (2018.01)
(Continued)

(52) U.S. Cl.
CPC ......... *B60G 17/0165* (2013.01); *B60G 17/06* (2013.01); *H04L 67/12* (2013.01); *H04W 4/026* (2013.01); *H04W 4/40* (2018.02); *B60G 2400/821* (2013.01); *B60G 2401/16* (2013.01); *B60G 2500/10* (2013.01); *B60G 2600/0422* (2013.01); *B60G 2600/182* (2013.01); *B60G 2800/162* (2013.01)

(58) Field of Classification Search
CPC .. B60G 17/0165; B60G 17/018; B60G 17/06; B60G 2400/102; B60G 2500/10
See application file for complete search history.

(56) References Cited

U.S. PATENT DOCUMENTS 8,260,496 B2    9/2012  Gagliano
8,788,146 B1 *  7/2014  Lu ........................ B60G 17/015
                                                    280/5.518
(Continued)

FOREIGN PATENT DOCUMENTS

GB        2525839 A       11/2015
WO     2014186359 A1   11/2014

OTHER PUBLICATIONS

Shreyas Balakuntala et al., "An Intelligent System to Detect, Avoid and Maintain Potholes: A Graph Theoretic Approach", Sep. 18, 2013.
(Continued)

Primary Examiner — Redhwan K Mawari
(74) Attorney, Agent, or Firm — Burr & Forman, LLP (57) ABSTRACT A vehicle suspension control system includes a controller configured to receive recorded information related to a location and severity of a surface irregularity to be traversed by a vehicle, determine a desired damping force based on the information, and send a damper adjustment signal based on the desired damping force. The vehicle suspension control system further includes an adjustable damper configured to adjust a damping force of the vehicle suspension system in response to the damper adjustment signal. Methods include controlling vehicle suspension systems and gather information related to irregularities in a surface.

16 Claims, 5 Drawing Sheets (51) Int. Cl.
*B60G 17/06* (2006.01)
*H04W 4/02* (2018.01)
*H04L 29/08* (2006.01)

(56) References Cited

U.S. PATENT DOCUMENTS

| | | | | |
|---|---|---|---|---|
| 8,918,253 | B2* | 12/2014 | Norton | B60G 17/018 |
| | | | | 701/37 |
| 2004/0036601 | A1* | 2/2004 | Obradovich | B60C 23/0408 |
| | | | | 340/540 |
| 2004/0094912 | A1* | 5/2004 | Niwa | B60G 17/0165 |
| | | | | 280/5.518 |
| 2004/0263357 | A1* | 12/2004 | Hamilton | G08G 1/01 |
| | | | | 340/936 |
| 2007/0063875 | A1* | 3/2007 | Hoffberg | G08G 1/0104 |
| | | | | 340/995.1 |
| 2010/0042293 | A1* | 2/2010 | Moshchuk | B60G 17/08 |
| | | | | 701/37 |
| 2013/0151412 | A1* | 6/2013 | Spahl | G06Q 20/40 |
| | | | | 705/44 |
| 2013/0345933 | A1* | 12/2013 | Norton | B60G 17/018 |
| | | | | 701/37 |
| 2014/0094989 | A1* | 4/2014 | Dadu | G08G 1/0962 |
| | | | | 701/1 |
| 2014/0196529 | A1 | 7/2014 | Cronin et al. | |
| 2014/0306834 | A1* | 10/2014 | Ricci | H04W 4/46 |
| | | | | 340/902 |
| 2016/0009276 | A1* | 1/2016 | Moeller | G06F 16/162 |
| | | | | 701/41 |

OTHER PUBLICATIONS

Media Centre, "Jaguar Land Rover Announces Technology Research Project to Detect, Predict and Share Data on Potholes", Mar. 29, 2016.

* cited by examiner

RIDE PERFORMANCE OPTIMIZATION SYSTEMS AND DEVICES, AND RELATED METHODS

TECHNICAL FIELD

The present disclosure relates generally to vehicle systems configured to transmit and receive information related to irregularities in a surface from a remote server.

BACKGROUND

Vehicle suspension systems include resilient devices configured to absorb forces such as road shock and other vibrations while providing a smooth and comfortable ride for vehicle occupants. Vehicles may incorporate active or adaptive suspension systems to actively control the vertical movements of the vehicle wheels rather than allowing such movements to be determined entirely by interactions with the road surface.

Suspension systems may include control systems configured to recognize irregularities (e.g., potholes, bumps, etc.) in a surface to be traversed by the vehicle, and adjust suspension characteristics based on the location and size of the irregularity to provide a more comfortable ride. For example, such systems may include optical, radar, or other detectors or sensors that map the surface or other control systems configured to identify the presence of irregularities in the road surface, and adjust one or more suspension response characteristics accordingly.

It is desired to provide vehicle suspensions and control systems configured to provide improved capabilities for adjusting suspension response characteristics based on information regarding irregularities in the road surface.

SUMMARY

In accordance with various exemplary embodiments, a vehicle suspension control system includes a controller configured to receive recorded information related to a location and severity of a surface irregularity to be traversed by a vehicle, determine a desired damping force based on the information, and send a damper adjustment signal based on the desired damping force. The vehicle suspension control system also includes an adjustable damper configured to adjust a damping force of the vehicle suspension system in response to the damper adjustment signal.

In accordance with various exemplary embodiments, a method of gathering information related to an irregularity in a road surface comprises receiving, at one or more controllers respectively associated with one or more vehicles, information related to the irregularity in the road surface detected by a sensor operably coupled with a respective one of the one or more controllers; transmitting, from the one or more controllers of the one or more vehicles, the information related to the irregularity in the road surface to an information storage medium remote from the one or more vehicles; and transmitting, from the controller of the one or more vehicles, information related to a unique identity of each of the one or more vehicles to the information storage medium.

In accordance with various exemplary embodiments, a method of controlling a suspension system of a vehicle comprises transmitting information relating to a unique identity of a vehicle, a location of the vehicle, and a direction of travel of the vehicle; receiving information related to an approaching road surface irregularity based on the location and direction of travel of the vehicle; and adjusting a damping force of the suspension system based on the information related to the approaching road surface irregularity.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of exemplary embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. The features explained individually in the description can be mutually combined in any technically expedient manner and disclose additional embodiments of the present disclosure.

The present disclosure relates to systems and methods configured to transmit information related to irregularities in a surface to be traversed by a vehicle between a remote server and one or more vehicles. In an exemplary embodiment, a vehicle suspension control system includes a controller that receives information from a remote server related to a location and severity of an irregularity in a surface. The vehicle suspension control system also includes an adjustable suspension component, such as an adjustable damper, configured to alter a response characteristic of the vehicle suspension system in response to the recorded information. Receiving information from the remote server about irregularities in the surface prior to encountering the irregularities enables the vehicle control system to prepare the suspension (e.g., alter the response characteristic of the adjustable suspension component) for contact with the irregularity, thereby providing improved ride comfort and handling of the vehicle. For example, in an exemplary embodiment, the vehicle control system may increase a damping force of a damper of the vehicle suspension to a maximum damping force to minimize the vertical distance a wheel of the vehicle "falls" into a depression in the surface. According to some exemplary embodiments, it is also contemplated that the vehicle control systems of the disclosure are configured to alter one or more response parameters of one or both of a steering system and braking system of the vehicle based on information received from the remote server regarding irregularities or other events in the surface to be traversed by the vehicle.

In exemplary embodiments, the vehicle may include a sensor configured to provide information to the controller related to an irregularity in the surface traversed by the vehicle. The vehicle may include a transmitter operatively coupled with the controller, and the transmitter may be configured to transmit information to the remote server related to irregularities encountered by the vehicle.

Figure 1:
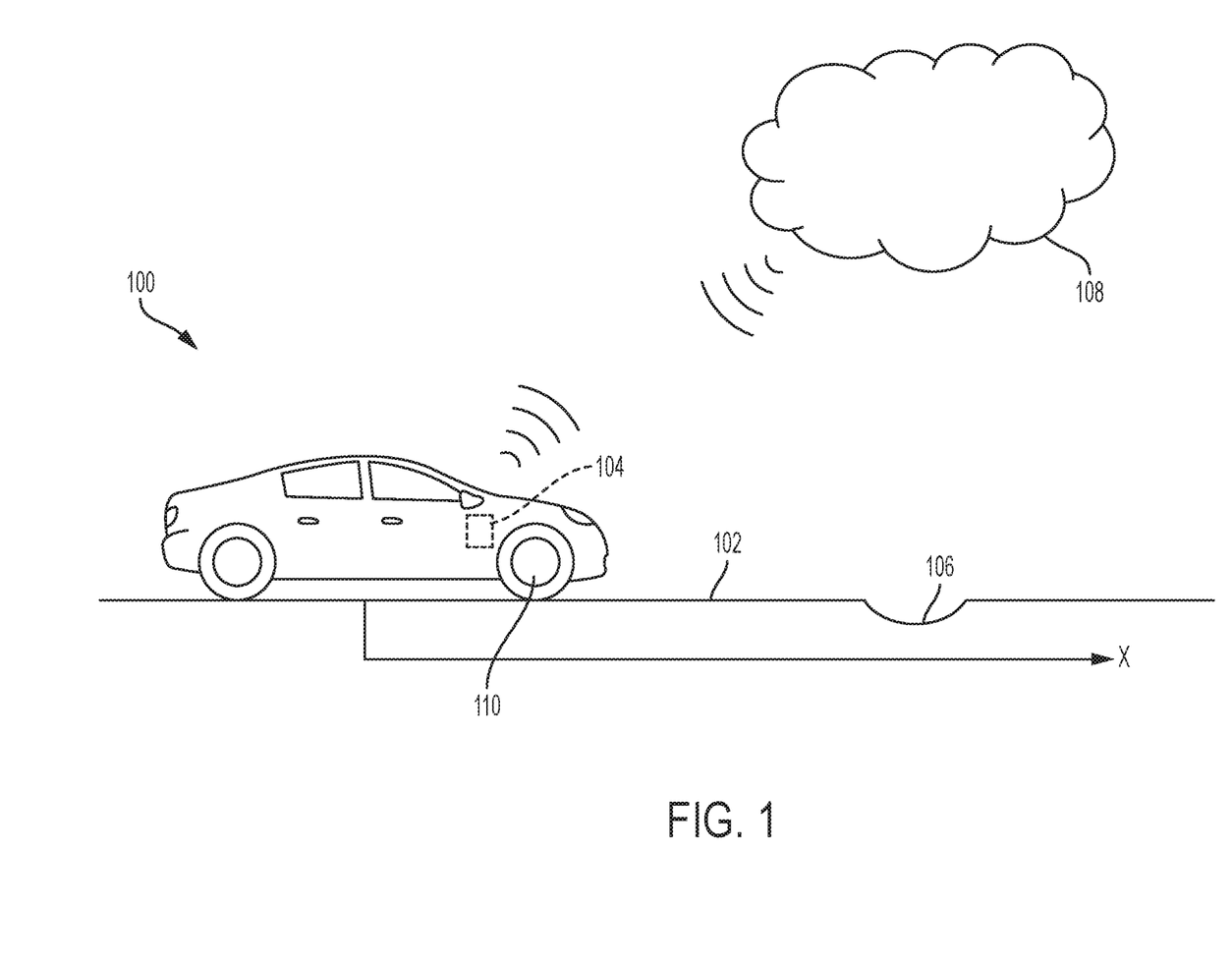
FIG. 1 is a schematic representation of a vehicle, a surface to be traversed by the vehicle, and a remote server according to an exemplary embodiment of the disclosure.

Referring now to FIG. 1, a vehicle 100 is shown traversing a surface 102 in a direction x. The vehicle 100 includes a controller 104 including or operatively coupled with a transmitter configured to transmit information regarding an irregularity 106 in the surface 102 between the vehicle 100 and a remote data server 108 (e.g., a cloud database or other remote data storage location or device). The remote data server 108 may represent a single data storage location, such as a server with a data storage medium such as a hard drive, flash drive or other semiconductor memory, etc. In some exemplary embodiments, the remote data server 108 may represent multiple data storage locations connected by wired or wireless networks, etc. Communication between the vehicle 100 and the remote data server 108 may be through radio-frequency (RF) electromagnetic signals using conventional communication protocols such as, for example, a global area network, satellite communication, etc. Other types of signals/communication methods may be used as would be understood by those of ordinary skill in the art.

The vehicle 100 includes one or more adjustable suspension components (not shown), such as one or more adjustable dampers, configured to alter a response characteristic of a suspension of the vehicle based on a signal from controller 104. For example, vehicles according to exemplary embodiments of the disclosure may include devices and systems such as those shown and described in U.S. Pat. No. 8,918,253 to Norton et al., entitled "Ride Performance Optimization in an Active Suspension System" and issued Dec. 23, 2014; U.S. Pat. No. 9,321,320 to Norton et al., entitled "Ride Performance Optimization in an Active Suspension System" and issued Apr. 26, 2016; and U.S. Patent App. Pub. No. US 2016/0046166 to Norton et al., entitled "Ride Performance Optimization in an Active Suspension System" and published Feb. 18, 2016, the entire contents of each of which is incorporated by reference herein. The systems and methods described in the above documents have broad applicability to all types of surface irregularities, but may have particular application to surface irregularities that comprise depressions in the surface, such as potholes. While the systems and methods described herein are primarily described in the context of irregularities comprising depressions in the surface, the systems and methods of the disclosure have application to irregularities other than depressions, such as bumps or any irregularity that can potentially negatively affect the ride comfort and/or directional stability of the vehicle.

In accordance with the above references, in an exemplary embodiment, when the irregularity 106 in the surface 102 comprises a depression, such as a pothole, sensors coupled with the suspension system of the vehicle 100 provide information to the controller 104 related to a vertical velocity a one or more wheels 110 of the vehicle 100 as the wheel 110 encounters the depression. If the vertical velocity of the one or more wheels 110 exceeds one or more predetermined threshold velocities, a damping rate of a damper of the suspension is adjusted (e.g., increased) based on a signal from the controller 104 to reduce the vertical velocity of the one or more wheels 110 and lessen an impact of the one or more wheels 110 on an opposite side of the depression as the vehicle 100 traverses the depression.

In exemplary embodiments, the controller 104 may be configured to provide signals that alter other response characteristics of the vehicle suspension, such as by reducing a damping rate of a damper, individually altering compression/and or rebound damping of the damper, altering a spring rate of adjustable springs, etc. Such signals from the controller 104 may be based on information gathered from sensors associated with the suspension of the vehicle 100, such as wheel height sensors, or may be based on information from other sensors configured to obtain information regarding the surface 102 and irregularities 106 thereon, such as RADAR or LIDAR detectors, optical detectors, etc.

Additionally, according to exemplary embodiments, the controller 104 is configured to adjust a response characteristic of the suspension of the vehicle 100 based on information received at the controller 104 from the remote data server 108. For example, the remote data server 108 may be configured to collect (e.g., receive) information from multiple vehicles (e.g., vehicle 100 and/or other vehicles) as the vehicles traverse the surface 102 and transmit information regarding irregularities (e.g., irregularity 106 and/or other irregularities) in the surface 102 to the remote data server 108. The remote data server 108 may be configured to transmit (e.g., broadcast) information regarding the irregularities to the multiple vehicles.

Figure 2:
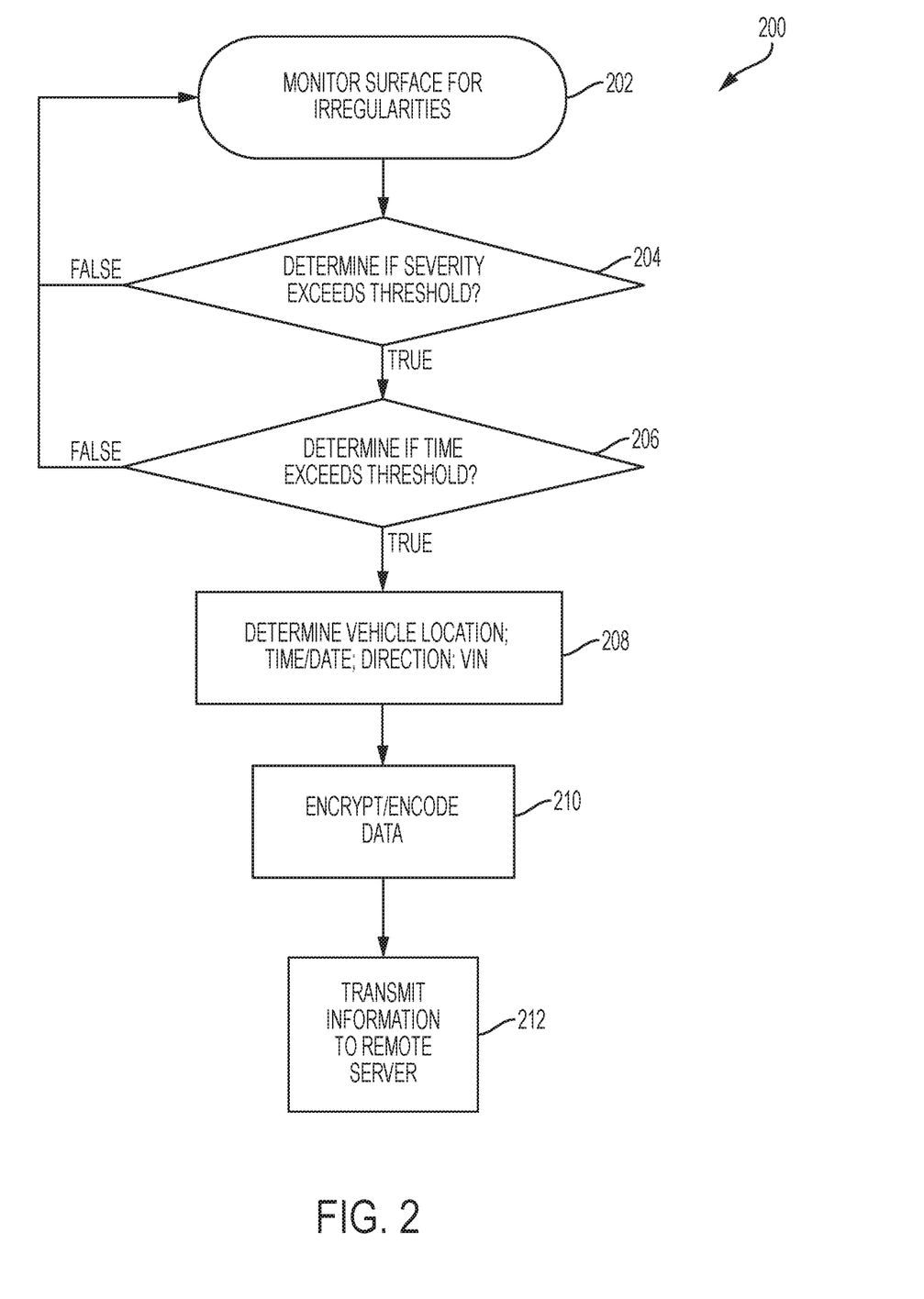
FIG. 2 flow chart showing an in-vehicle control routine for collecting and transmitting information related to irregularities in the surface to a remote server according to an exemplary embodiment of the disclosure.

Referring now to FIG. 2, an in-vehicle control routine 200 for transmitting data related to irregularities (e.g., irregularity 106 in FIG. 1) in a surface 102 (FIG. 1) traversed by a vehicle 100 (FIG. 1) is shown. At block 202, a controller (e.g., controller 104) of the vehicle 100 continuously monitors the surface 102 for irregularities. As a non-limiting example, the controller 104 may include and/or execute implementations of a control algorithm as described in U.S. Pat. Nos. 8,918,253, 9,321,320, and/or U.S. Patent App. Pub. No. US 2016/0046166, identified and incorporated by reference above. In particular, the controller 104 may continuously monitor a rate of change of a wheel height of one or more wheels (e.g., wheel 110 shown in FIG. 1), such as by calculating a time derivative of a vertical position of the wheel 110 as indicated by, e.g., a wheel height sensor. The controller 104 may assign a severity rating to the sensed irregularity based on information from a sensor of the vehicle. For example, in an exemplary embodiment, a severity rating is assigned based on the rate of change of the wheel height (i.e., instantaneous vertical velocity of the wheel 110). At block 204, the controller 104 determines whether the determined severity (e.g., determined instantaneous vertical velocity or other measure of severity) exceeds a predetermined threshold severity. As a non-limiting example, the predetermined threshold severity may correspond to an instantaneous vertical velocity of between about 0.2 meters per second and about 5 meters per second, depending on such factors as suspension tuning, vehicle speed, vehicle tire characteristics, etc.

If the controller 104 determines that the instantaneous vertical velocity of the wheel 110 does not exceed the predetermined threshold, the control routine 200 returns to block 202. If the instantaneous vertical velocity of the wheel 110 does exceed the predetermined velocity threshold, then the control routine 200 advances from block 204 to block 206.

At block 206, the controller 104 begins incrementing a timer to determine the time period over which the instantaneous vertical velocity of the wheel 110 exceeds the predetermined velocity threshold over a predetermined time period. For example, if the instantaneous vertical velocity of the wheel 110 does not exceed the predetermined velocity threshold over a predetermined time period such as 25 milliseconds, the control routine 200 returns to block 202. In some exemplary embodiments, the controller 104 may be configured to correlate the time period over which the instantaneous vertical velocity of the wheel 110 exceeds the predetermined velocity threshold with a velocity of the vehicle to determine a length of the irregularity. In some embodiments, the severity rating of the irregularity may be based at least in part on the determined length of the irregularity. If the instantaneous vertical velocity of the wheel 110 does exceed the predetermined velocity threshold over the entire predetermined time period, the control routine 200 advances to block 208.

In block 208, the controller 104 of the vehicle 100 determines various factors related to the location, direction of travel, and identity of the vehicle. For example, the controller 104 may determine the location of the vehicle 100 based on, e.g., a global positioning system (GPS) providing information regarding a latitude coordinate and a longitude coordinate of the vehicle at the time the controller 104 determined the instantaneous vertical velocity of the wheel 110 exceeded the predetermined velocity threshold over the predetermined time period. GPS information may also provide information regarding a direction of travel of the vehicle 100. The controller 104 may also record the date and time at which the vertical velocity of the wheel exceeded the predetermined threshold velocity and over the predetermined time period. A unique identifier associated with the vehicle 100 may also be associated with the information collected by the controller 104. In an exemplary embodiment, the unique identifier comprises at least a portion of a vehicle identification number (VIN) associated with the vehicle 100.

In block 210, at least a portion of the information collected by the controller is encrypted (e.g., encoded) using any of a number of conventional encryption algorithms, such as an end-to-end encryption algorithm as is known to those of ordinary skill in the art. For example, at least information related to the VIN of the vehicle is encrypted by the controller 104. In some exemplary embodiments, additional information, such as the position, direction, speed, etc. of the vehicle may be encrypted.

In block 212, the encrypted information is transmitted from the controller 104 via, e.g., a transmitter with which the controller 104 is operatively connected, to a remote data server (e.g., remote data server 108 shown in FIG. 1) configured to receive information from the controller 104.

Figure 3:
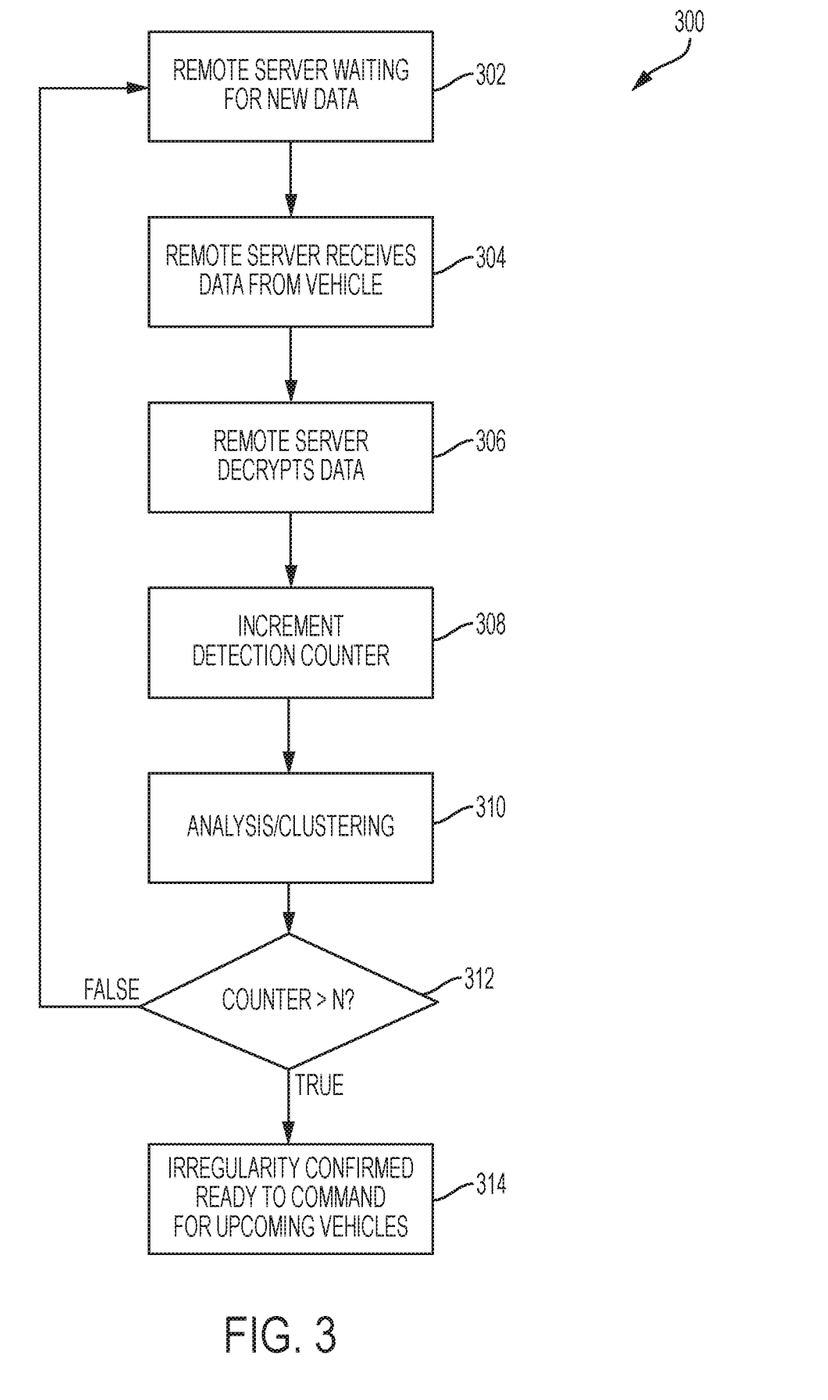
FIG. 3 is a flow chart showing a control routine of a remote server for processing information related to irregularities in the surface received from a vehicle according to an exemplary embodiment of the disclosure.

Referring now to FIG. 3, a control routine 300 of a remote server (e.g., remote server 108 shown in FIG. 1) configured to receive and process information from at least one controller (e.g., controller 104 shown in FIG. 1) of at least one vehicle (e.g., vehicle 100 shown in FIG. 1) is shown. At block 302, the remote server 108 waits to receive information from the controller 104. Once the remote server 108 receives information from the controller 104 of the vehicle 100 at block 304, the remote server 108 decrypts the information (e.g., with a decryption key) at block 306.

The remote server 108 may be configured to record the number of times an irregularity is reported in a particular location by one or more vehicles. The remote server 108 may be further configured to only begin transmitting information regarding a reported irregularity once the irregularity has been reported to the remote server 108 a predetermined number of times (e.g., a tunable threshold N) by one or more vehicles (e.g., vehicle 100). Stated another way, the remote server 108 may confirm the existence of a particular irregularity by waiting to receive information regarding an irregularity at a particular location a predetermined number of times. For example, the remote server 108 may wait until an irregularity in a particular location is reported at least 10 times before adding the irregularity to the database of irregularities of which information is disseminated to individual vehicles. Accordingly, at block 308, the remote server 108 increments a counter configured to record the number of times information regarding an irregularity at a particular location is transmitted to the remote server 108. In some embodiments, the tunable threshold N may be set to a number less than 10 or greater than 10, and the counter will require the number N to be met before disseminating information about a particular irregularity to the individual vehicles.

In some cases, the information reported from the one or more vehicles may differ even when the one or more vehicles encounter the same irregularity. For example, information reported to the remote server regarding the same irregularity may be slightly different in terms of exact latitudinal and longitudinal location, exact direction of travel of the vehicle, etc. Additionally, the reported severity of the irregularity may differ from vehicle to vehicle and/or between encounters of the same vehicle with the irregularity. Accordingly, the remote server 108 may be configured to analyze and categorize information likely representing the same irregularity. For example, at block 310, the remote server 108 analyses and categorizes the data received with a k-means clustering algorithm, or another data analysis algorithm configured to group the individual reports of irregularities according to the likelihood that they represent reports of the same irregularity.

Once the counter reaches the predetermined number (e.g., 10) indicating the presence of a particular irregularity in block 312, the remote server 108 flags the irregularity as "confirmed" in block 314, and the remote server is ready to transmit information regarding the particular irregularity to one or more vehicles approaching the particular irregularity to enable the one or more vehicles to prepare (e.g., adjust a response characteristic of the suspension) for contact with the irregularity. In this manner, the remote server 108 creates a database with information regarding the location and severity of a plurality of irregularities.

Figure 4:
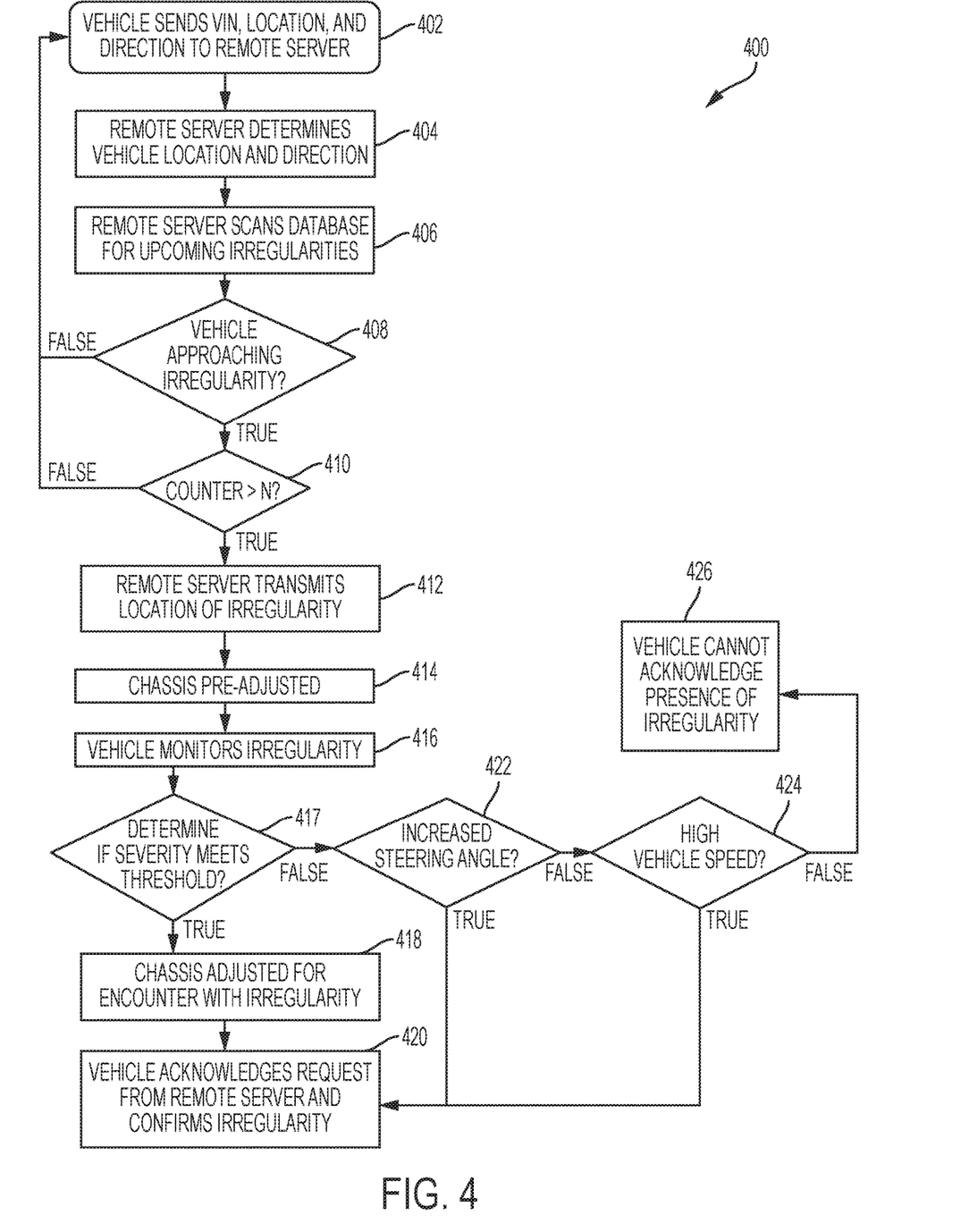
FIG. 4 is a flow chart showing a control routine of a remote server and a vehicle according to an exemplary embodiment of the disclosure.

Referring now to FIG. 4, a control routine 400 for transmitting information regarding recorded irregularities to a vehicle and receiving information from the vehicle regarding the presence or absence of the recorded irregularity is shown. At block 402, the vehicle (e.g., vehicle 100 shown in FIG. 1) transmits the vehicle identity (e.g., the VIN), location, and direction of the vehicle to the remote server 108 (FIG. 1) at regular time intervals. For example, the vehicle 100 may transmit its identity (e.g., at least a portion of a VIN associated with the vehicle 100), location (e.g., latitude and longitude determined by GPS), and direction of travel to the remote server 108 every 5 seconds. In some exemplary embodiments, the vehicle 100 may transmit its VIN, GPS location, and direction of travel to the remote server 108 more or less frequently than every 5 seconds. At block 404, the remote server 108 receives the vehicle identity, location, and direction, and at block 406, the remote server 108 scans the database for upcoming irregularities in the database based on the location and direction of the vehicle 100. At block 408, if the vehicle 100 is not approaching an irregularity in the database, the control routine 400 returns to block 402. If the vehicle 100 is approaching an irregularity in the database, the control routine 400 proceeds to block 410, and the remote server 108 determines whether the irregularity has been confirmed (e.g., whether the irregularity has been reported the predetermined number of times set by the tunable threshold N, such as 10 times). If the irregularity approached by the vehicle 100 has not been reported the predetermined number of times, the control routine 400 returns to block 402. If the irregularity has been reported a sufficient number of times, at block 412, the remote server 108 transmits to the controller 104 (FIG. 1) of the vehicle 100 the position (e.g., latitude and longitude) of the irregularity.

At block 414, the controller 104 of the vehicle 100 sends a signal to the adjustable component of the suspension of the vehicle 100 to alter a response characteristic of the suspension to prepare for contact of the one or more wheels 110 (FIG. 1) of the vehicle 100 with the irregularity. For example, one or more adjustable dampers of the vehicle suspension may exhibit an increased damping rate in response to the signal from the controller 104. In some exemplary embodiments, adjustable dampers may be configured to increase or reduce a damping force in response to the signal from the controller 104, or other adjustable suspension components may be configured to alter other response characteristics of the suspension in response to the signal from the controller 104. Additionally or alternatively, the controller 104 may send one or more signals to one or more other chassis components to adjust one or more response characteristics of the one or more other chassis components. For example, the controller may send one or more signals to one or both of a steering system and a braking system of the vehicle to alter one or more response characteristics of the steering system and/or braking system prior to the vehicle encountering the irregularity.

In an exemplary embodiment, at block 414, the one or more adjustable dampers are set to a "preload" damping force, increased from a baseline damping force setting but below a maximum damping force, in response to the signal from the controller 104 indicating the remote server 108 has identified an upcoming irregularity.

At block 416, the controller 104 monitors information from a sensor (e.g., a wheel height sensor) of the vehicle 100 to determine whether the vehicle 100 actually encounters the irregularity expected based on the information from the remote server 108. For example, the controller 104 may monitor the wheel height information received from the wheel height sensor to determine whether a vertical velocity of the wheel 110 (FIG. 1) exceeds a predetermined threshold, as described above.

If the vertical velocity of the wheel 110 exceeds the predetermined threshold, (i.e., if it is determined that the wheel 110 is falling into a pothole or other depression) then the control routine 400 advances to block 418, where the controller 104 signals one or more chassis components to adjust for an encounter with the irregularity. For example, the controller 104 may signal the adjustable damper to exhibit a maximum damping force. Additionally or alternatively, the controller 104 may signal other chassis components, such as a steering system and/or a braking system, to adjust to exhibit a particular desired response characteristic for an encounter with the irregularity. At block 420, the vehicle controller 104 acknowledges the instructions from the remote server 108 and confirms the presence of the irregularity to the remote server 108.

At block 417, if the vertical velocity of the wheel 110 reported from the wheel height sensor does not exceed a predetermined threshold, the control routine 400 attempts to determine why the irregularity was not encountered. For example, at block 422, the controller 104 determines whether a change in steering wheel angle (e.g., from a low steering angle or straight ahead position to an increased steering angle, such as a steering wheel angle exceeding a predetermined steering wheel angle threshold) occurred at the location corresponding to the expected location of the irregularity. Such a change in steering wheel angle may indicate that a driver of the vehicle 100 steered to avoid the irregularity. If such a change in steering angle occurred, the control routine 400 proceeds to block 420 and confirms the presence of the irregularity.

If such a change in steering angle did not occur, the control routine 400 proceeds to block 424, where the controller 104 of the vehicle 100 determines whether the vehicle 100 exceeded a predetermined velocity threshold at the location corresponding to the expected location of the irregularity. High velocity may cause the controller 104 to fail to recognize the presence of the irregularity. For example, if the velocity of the vehicle exceeds the predetermined velocity threshold, the controller 104 may not recognize the presence of the irregularity based on information from the sensors (e.g., wheel height sensors), as the vertical height of the wheel 110 may change too slowly (e.g., based on a damping rate of the suspension, such as the "preload" damping rate described above) to significantly fall into the irregularity. The predetermined velocity threshold may be equal to, as a non-limiting example, 60 miles per hour.

If the vehicle velocity exceeded the predetermined vehicle velocity at the location at which the irregularity was expected based on the information from the remote server 108, the control routine 400 proceeds to block 420, and confirms the presence of the irregularity to the remote server 108.

If the vehicle velocity did not exceed the predetermined vehicle velocity, the control routine 400 proceeds to block 426, where the vehicle controller 104 reports to the remote server 108 that the presence of the irregularity cannot be confirmed.

Figure 5:
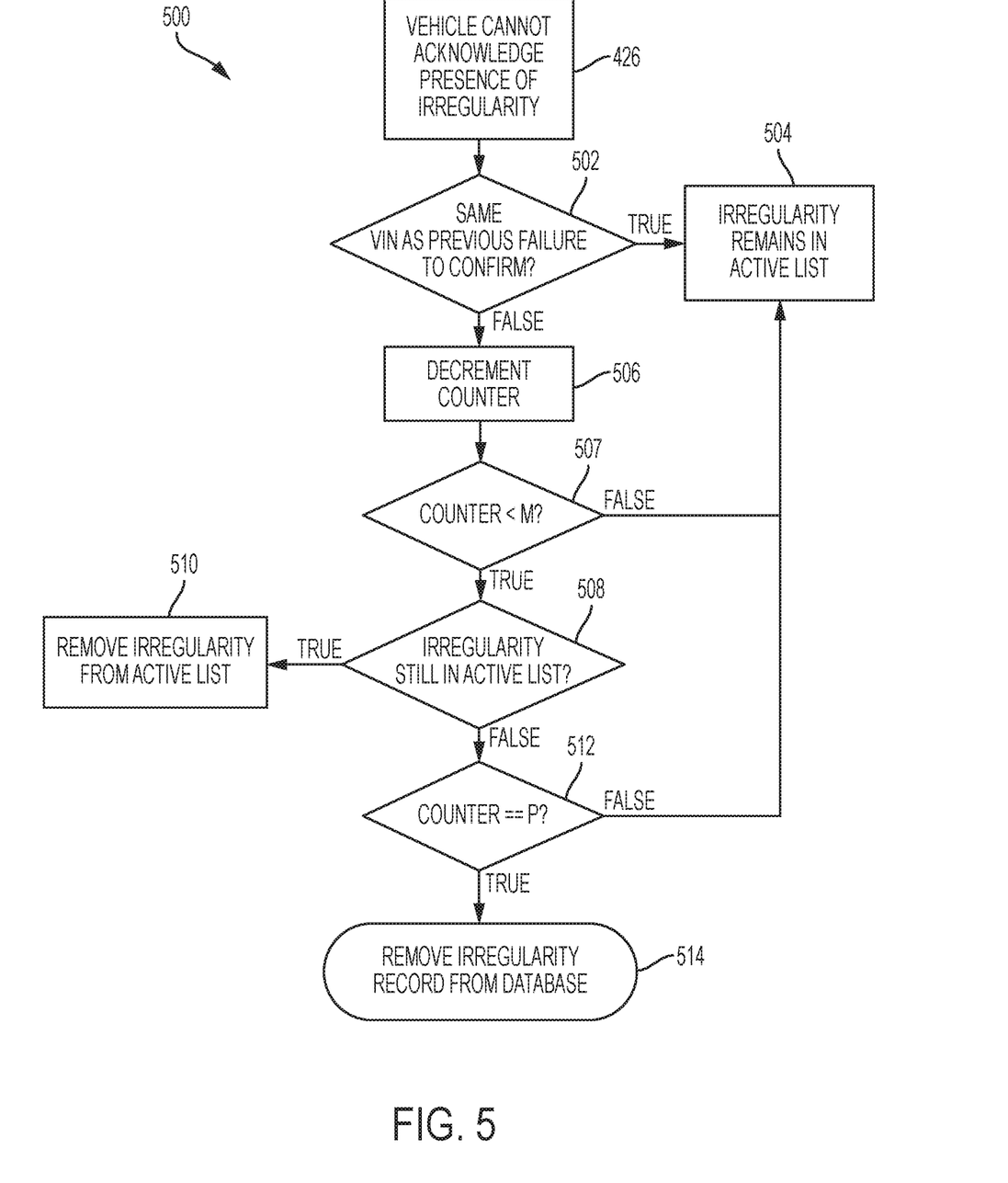
FIG. 5 is a flow chart showing a control routine of a remote server according to an exemplary embodiment of the disclosure.

From block 426, the control routine 400 advances to control routine 500 shown in FIG. 5. Control routine 500 is an exemplary embodiment of a routine performed within the remote server 108 to remove a recorded irregularity from the remote server 108 database when a predetermined number of separate vehicles fail to confirm the presence of the irregularity.

At block 502, the remote server 108 determines whether a previous failure to confirm was received from the same vehicle (as determined by the unique identifier, e.g., the VIN) with respect to the same irregularity. If the same vehicle previously failed to confirm the irregularity, the control routine 500 advances to block 504, and the irregularity remains in an active list of irregularities to be transmitted to vehicles as the vehicles approach each irregularity. If a certain vehicle consistently avoids an irregularity, the driver of the vehicle may be adept at avoiding the irregularity each time the vehicle travels by the irregularity. If a failure to confirm the irregularity was not previously received from the same vehicle, then the remote server 108 decrements the counter (e.g., the counter incremented at block 308 in FIG. 3) at block 506. Once the counter is decremented below a particular numerical value, such as a tunable decrement threshold M, at block 507, the control routine 500 advances to block 508, where the remote server 108 determines whether the irregularity is present in the active list of irregularities to be transmitted. The tunable decrement threshold M may be a number greater than 10, less than 10, etc. In an exemplary embodiment, the tunable threshold M is 5. At block 508, if the irregularity is still in the active list, the routine advances to block 510 where the irregularity is removed from the active list. If the irregularity was previously removed from the active list, the remote server 108 determines whether the counter has reached a tunable removal threshold P at block 512. In an exemplary embodiment, the tunable removal threshold P is zero. In other exemplary embodiments, the tunable removal threshold may be, e.g., a non-zero integer. Once the counter reaches the tunable removal threshold P, the irregularity is removed from the main database and the information regarding the irregularity is deleted or archived in an archival database at block 514.

In the description above, reference may be made to the controller (e.g., ECU) as a single component. However, this configuration is merely an example and is subject to a variety of implementation-specific variations. For example, in some embodiments, the functions described in reference to the controller may be performed across multiple controllers or among multiple components of the controller. The controllers and/or processors disclosed herein, and the remote server disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system of the controller and/or remote server to operate the logic or portions of the logic presented in the methods disclosed herein. For example, in certain embodiments, the controller and/or remote server may include computer code disposed on a computer-readable storage medium or a process controller that includes such a computer-readable storage medium. The computer code may include instructions, data maps such as look-up-tables, algorithms, etc.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiments described herein be considered as exemplary only.

What is claimed is:

1. A vehicle suspension control system, comprising:
a controller:
receiving, from a remote information storage medium, recorded information related to a location and a severity of a surface irregularity to be traversed by a vehicle;

determining a desired damping force based on the recorded information;

sending a damper adjustment signal based on the desired damping force;

determining whether the vehicle encountered the surface irregularity indicated by the recorded information based on wheel height information captured by a wheel height sensor when the vehicle traverses the location of the surface irregularity;

in response to determining that the wheel height information indicates that the surface irregularly was not encountered, determining whether an increased steering angle occurred when the vehicle traversed the location of the surface irregularity or determine a speed of travel of the vehicle exceeded a speed of travel threshold when the vehicle traversed the location of the surface irregularity; and transmitting a confirmation of the surface irregularity to the remote information storage medium in response to the wheel height information indicating that the irregularity was encountered, determining that an increased steering angle occurred when the vehicle traversed the location of the irregularity, or determining that a speed of travel of the vehicle exceeded a speed of travel threshold when the vehicle traversed the location of the irregularity; and an adjustable damper configured to adjust a damping force of a vehicle suspension system in response to the damper adjustment signal.

2. The vehicle suspension control system of claim 1, wherein the controller is receiving the recorded information prior to the vehicle encountering the surface irregularity.

3. The vehicle suspension control system of claim 1, further comprising a receiver operably coupled with the controller, the receiver receiving the recorded information from the remote information storage medium.

4. The vehicle suspension control system of claim 1, wherein the remote information storage medium comprises cloud-based data storage.

5. The vehicle suspension control system of claim 1, wherein the wheel height information indicates a rate of change of a wheel height of a wheel connected to the vehicle suspension system of the vehicle.

6. The vehicle suspension control system of claim 1, wherein the controller is determining the severity and a length of the surface irregularity based on the wheel height information as the vehicle encounters the surface irregularity.

7. The vehicle suspension control system of claim 6, wherein the controller is transmitting the wheel height information related to the severity and the length of the surface irregularity to the information storage medium through a transmitter operatively coupled with the controller.

8. The vehicle suspension control system of claim 7, wherein the transmitter is further transmitting information related to the location of the surface irregularity and an identification of the vehicle.

9. The vehicle suspension control system of claim 8, wherein the controller is encrypting the information related to at least the identification of the vehicle.

10. The vehicle suspension control system of claim 1 wherein the controller is determining whether an increased steering angle occurred by determining whether the increased steering angle exceeded a steering wheel angle threshold when the vehicle traversed the location of the surface irregularity.

11. The vehicle suspension control system of claim 1 wherein the controller is transmitting a report indicating that the surface irregularity cannot be confirmed in response to:

the wheel height information indicating that the irregularity was not encountered, determination that a steering angle did not exceed a steering wheel angel threshold when the vehicle traversed the location of the irregularity, and determination that the speed of travel of the vehicle did not exceed the speed of travel threshold when the vehicle traversed the location of the irregularity.

12. A vehicle suspension control system comprising a controller:

receiving recorded information comprising a location of a surface irregularity to be traversed by a vehicle;

adjusting a damping force on an adjustable damper of a vehicle suspension system of the vehicle prior to traversing the location of the surface irregularity;

determining whether the vehicle encountered the surface irregularity indicated by the recorded information based on sensor data captured by a sensor of the vehicle as the vehicle traverses the location of the surface irregularity; and in response to determining that the vehicle encountered the surface irregularity, transmitting a confirmation that the surface irregularity was encountered by the vehicle to a remote information storage medium.

13. The vehicle suspension control system of claim 12, wherein the controller is adjusting the damping force on the adjustable damper by adjusting the damping force to a preload damping force, the preload damping force being increased from a baseline damping force setting and below a maximum damping force setting.

14. The vehicle suspension control system of claim 12 wherein the controller is adjusting the damping force to a maximum damping force setting in response to determining that the vehicle encountered the surface irregularity.

15. The vehicle suspension control system of claim 12 wherein the controller is adjusting one or more chassis components in response to determining that the vehicle encountered the surface irregularity.

16. A method comprising:

receiving recorded information comprising a location of a surface irregularity to be traversed by a vehicle;

adjusting a damping force on an adjustable damper of a vehicle suspension system of the vehicle prior to traversing the location of the surface irregularity;

determining whether the vehicle encountered the surface irregularity indicated by the recorded information based on sensor data captured by a sensor of the vehicle as the vehicle traverses the location of the surface irregularity; and in response to determining that the vehicle encountered the surface irregularity, transmitting a confirmation that the surface irregularity was encountered by the vehicle to a remote information storage medium.

* * * * *